US010698794B1

(12) United States Patent
Ganesan et al.

(10) Patent No.: US 10,698,794 B1
(45) Date of Patent: Jun. 30, 2020

(54) APPLICATION CONTAINER AND APPLICATION SERVICE SYSTEM

(71) Applicant: EMC Corporation, Hopkinton, MA (US)

(72) Inventors: Ramkumar Ganesan, Bangalore (IN); Sachin Gopaldas Totale, Pleasanton, CA (US); Sreejanani Raghunathan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 146 days.

(21) Appl. No.: 14/970,207

(22) Filed: Dec. 15, 2015

(51) Int. Cl.
*G06F 11/36* (2006.01)
*G06F 8/71* (2018.01)
*H04L 29/08* (2006.01)

(52) U.S. Cl.
CPC ............ *G06F 11/3664* (2013.01); *G06F 8/71* (2013.01); *G06F 11/368* (2013.01); *H04L 67/34* (2013.01)

(58) Field of Classification Search
CPC ..... G06F 8/00–78; G06F 3/048–04897; G06F 9/451; G06F 9/453; G06F 11/36–3696
See application file for complete search history.

(56) References Cited

U.S. PATENT DOCUMENTS

| | | | | |
|---|---|---|---|---|
| 9,336,127 B2 * | 5/2016 | Koneru | G06F 11/3688 | |
| 2002/0184165 A1 * | 12/2002 | Deboer | G06F 11/3696 | 706/1 |
| 2003/0022657 A1 * | 1/2003 | Herschberg | G06F 8/60 | 455/414.1 |
| 2009/0265634 A1 * | 10/2009 | Beringer | G06F 8/38 | 715/733 |
| 2013/0124610 A1 * | 5/2013 | Smith | H04L 12/6418 | 709/203 |
| 2013/0332902 A1 * | 12/2013 | Wang | G06F 8/38 | 717/122 |
| 2014/0026120 A1 * | 1/2014 | Gu | G06F 11/3684 | 717/124 |

(Continued)

OTHER PUBLICATIONS

Artzi, Shay, et al. "Practical fault localization for dynamic web applications." 2010 ACM/IEEE 32nd International Conference on Software Engineering. vol. 1. IEEE, 2010. (Year: 2010).*

(Continued)

*Primary Examiner* — Geoffrey R St Leger
*Assistant Examiner* — Joanne G Macasiano
(74) *Attorney, Agent, or Firm* — Chamberlain, Hrdlicka, White, Williams & Aughtry

(57) ABSTRACT

A method and system for servicing application requests from mobile devices that includes receiving, from a client device, a first application request to test a software application, obtaining, based on the first application request, a first application container package that includes a first production version of the software application and a first context data. The method and system further includes generating, according to the first context data, a first interface of the first production version of the software application, transmitting the first interface to the client device, receiving, from the client device, a second application request to use the software application, and transmitting, in response to the second application request, the production version of the software application.

16 Claims, 12 Drawing Sheets

(56) References Cited

U.S. PATENT DOCUMENTS

| | | | | |
|---|---|---|---|---|
| 2014/0237451 | A1* | 8/2014 | Koneru | G06F 11/3688 717/124 |
| 2015/0286486 | A1* | 10/2015 | Smith, III | G06F 9/453 715/705 |
| 2015/0347970 | A1* | 12/2015 | Kirtane | G06F 11/3664 717/103 |
| 2016/0070551 | A1* | 3/2016 | Miller | G06F 17/30905 717/148 |
| 2016/0188317 | A1* | 6/2016 | Hilliar | G06F 8/65 717/172 |

OTHER PUBLICATIONS

Zhou, Yuchen, and David Evans. "SSOScan: automated testing of web applications for single sign-on vulnerabilities." 23rd {USENIX} Security Symposium ({USENIX} Security 14). 2014. (Year: 2014).*

Divya, A., and S. Devi Mahalakshmi. "An efficient framework for unified automation testing: a case study on software industry." Int. J . Adv. Res. Comput. Sci. Technol 2.1 (2014). (Year: 2014).*

PhoneGap, Retrieved from Internet on Dec. 6, 2015; Retrieved from Internet: URL: http://phonegap.com/ (4 pages).

PhoneGap—About the Project, Retrieved from Internet on Dec. 6, 2015; Retrieved from Internet: URL: http://phonegap.com/about/ (3 pages).

* cited by examiner

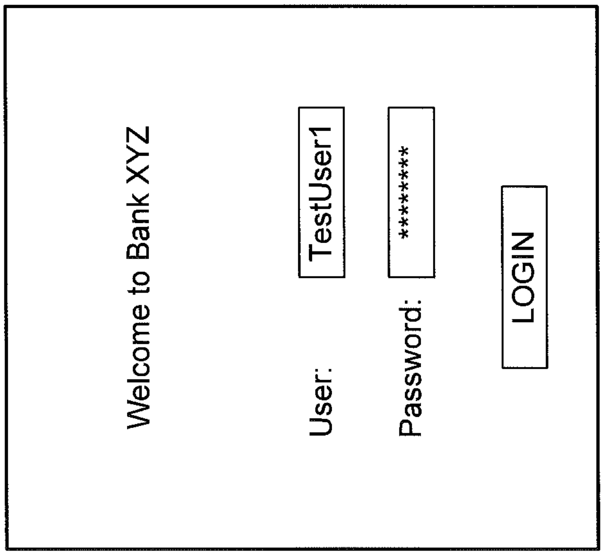
FIG. 7.1
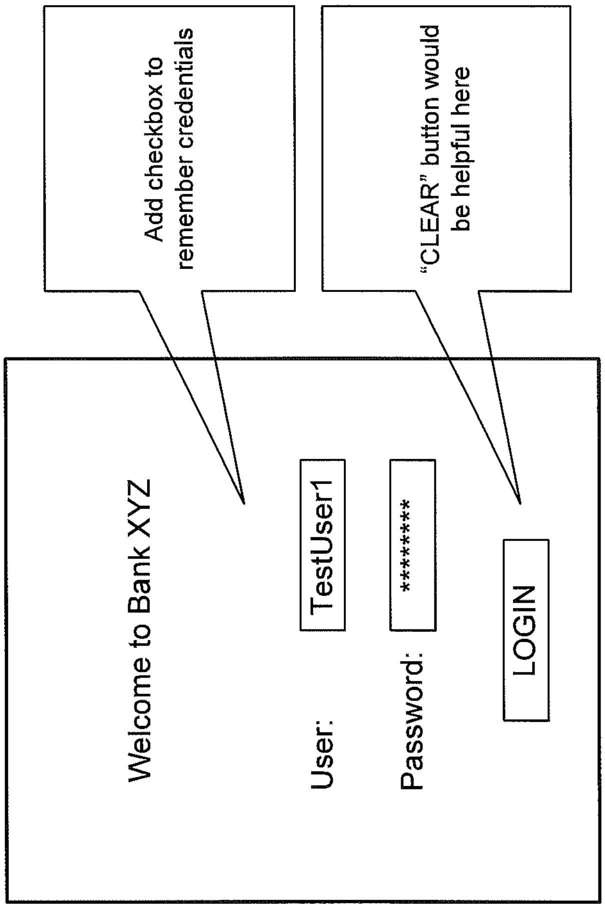
FIG. 7.2

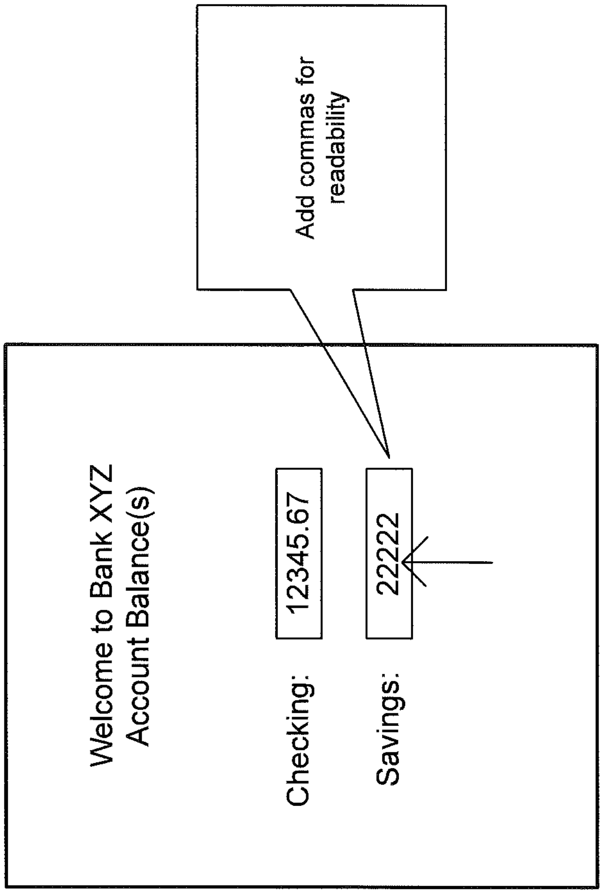
FIG. 7.4
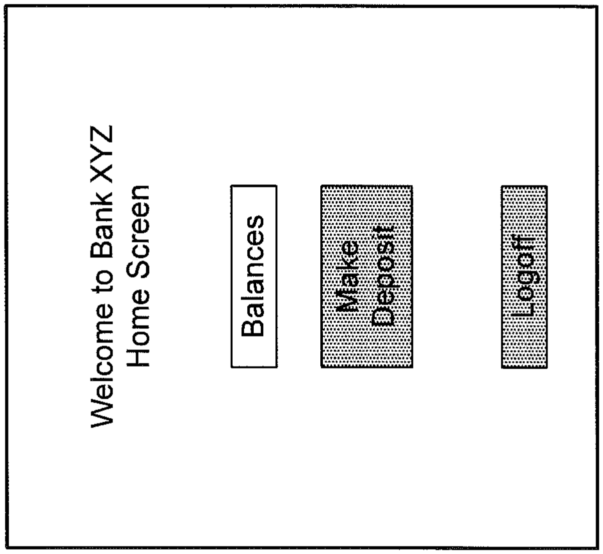
FIG. 7.3

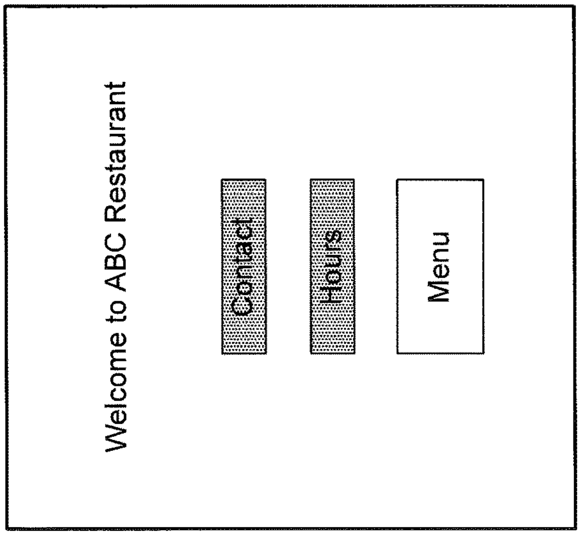
FIG. 8.1
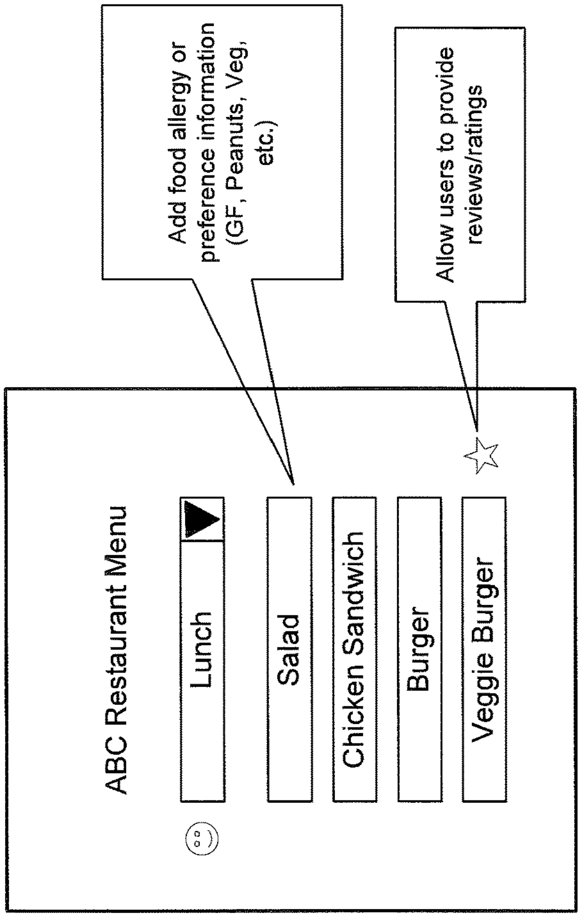
FIG. 8.2

```
<app_container_package package_id="ABCrestaurant">

    <interface_data id="auto_generated">
            <interface_element type="title" text="ABC Restaurant Menu"/>
            <interface_element type="dropdown">
                        <menu_item text="breakfast" selected="false"/>
                        <menu_item text="lunch" selected="true"/>
                        <menu_item text="dinner" selected="false"/>
            </interface_element>
    </inteface_data>

    <interface_data id="dev_provided">
            <interface_element type="button" text="Salad"/>
            <interface_element type="button" text="Chicken Sandwich"/>
            <interface_element type="button" text="Burger"/>
            <interface_element type="button" text="Veggie Burger"/>
    </interface_data>

    <metadata userid="testuser1">
            <comment>Add food allergy or preference information (GF, Peanuts, Veg, etc.)</comment>
            <comment>Allow users to provide reviews/ratings</comment>
            <annotation type="freeform" blob=annotation_data location_x=X location_y=Y/>
            <annotation type="like" location_x=A location_y=B/>
    </metadata>

    <software_app blob="/a/b/c.pkg"/>

</app_container_package>
```

FIG. 8.3

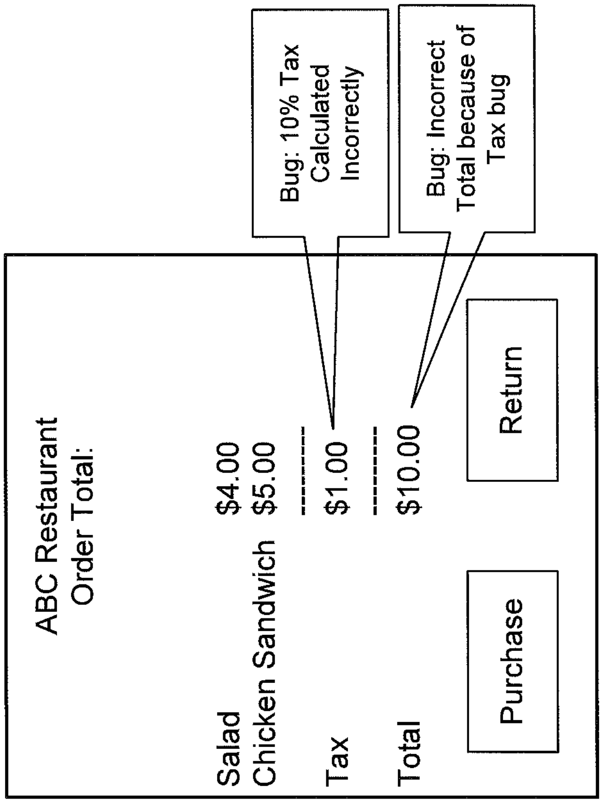
FIG. 8.4

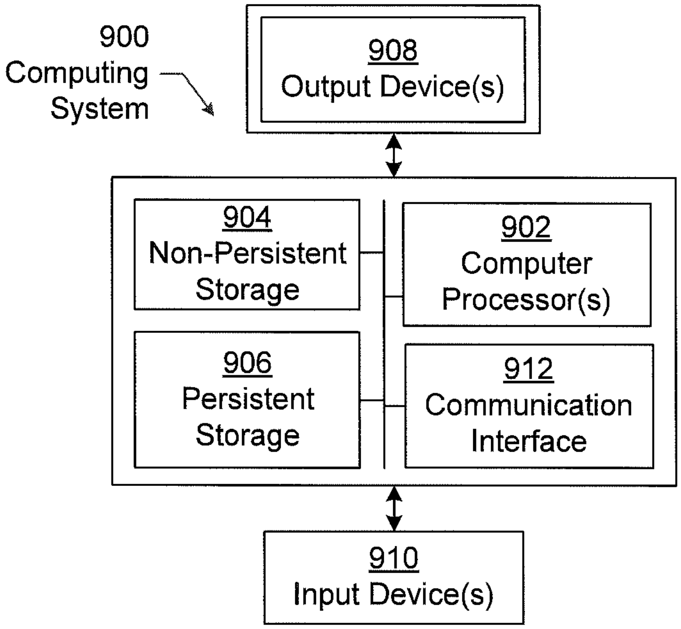
FIG. 9.1
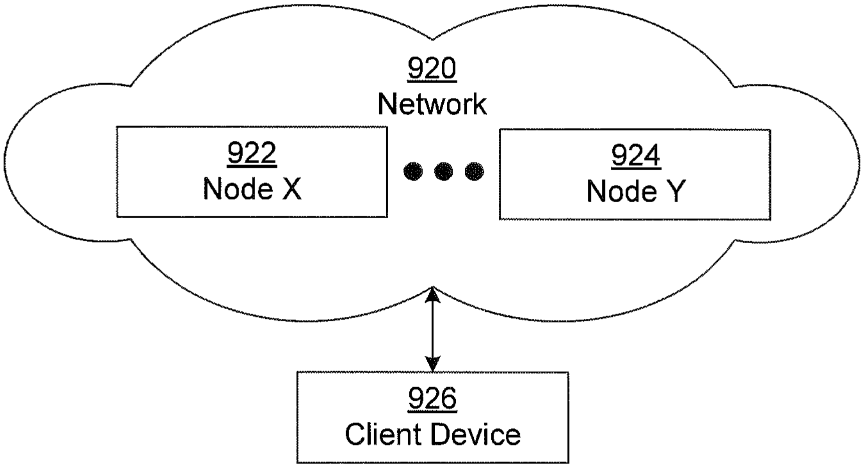
FIG. 9.2

APPLICATION CONTAINER AND APPLICATION SERVICE SYSTEM

BACKGROUND

A software application is a software application that executes on a client device. The software application may include one or more features such as graphical user interface widgets, processes, and other aspects of the software application. Traditional approaches for delivering software applications are limited to platform specific models.

BRIEF DESCRIPTION OF DRAWINGS

FIG. 7.1 shows an example in accordance with one or more embodiments of the technology.

FIG. 7.2 shows an example in accordance with one or more embodiments of the technology.

FIG. 7.3 shows an example in accordance with one or more embodiments of the technology.

FIG. 7.4 shows an example in accordance with one or more embodiments of the technology.

FIG. 8.1 shows an example in accordance with one or more embodiments of the technology.

FIG. 8.2 shows an example in accordance with one or more embodiments of the technology.

FIG. 8.3 shows an example in accordance with one or more embodiments of the technology.

FIG. 8.4 shows an example in accordance with one or more embodiments of the technology.

FIGS. 9.1 and 9.2 show a computing system in accordance with one or more embodiments of the technology.

DETAILED DESCRIPTION

Figure 1:
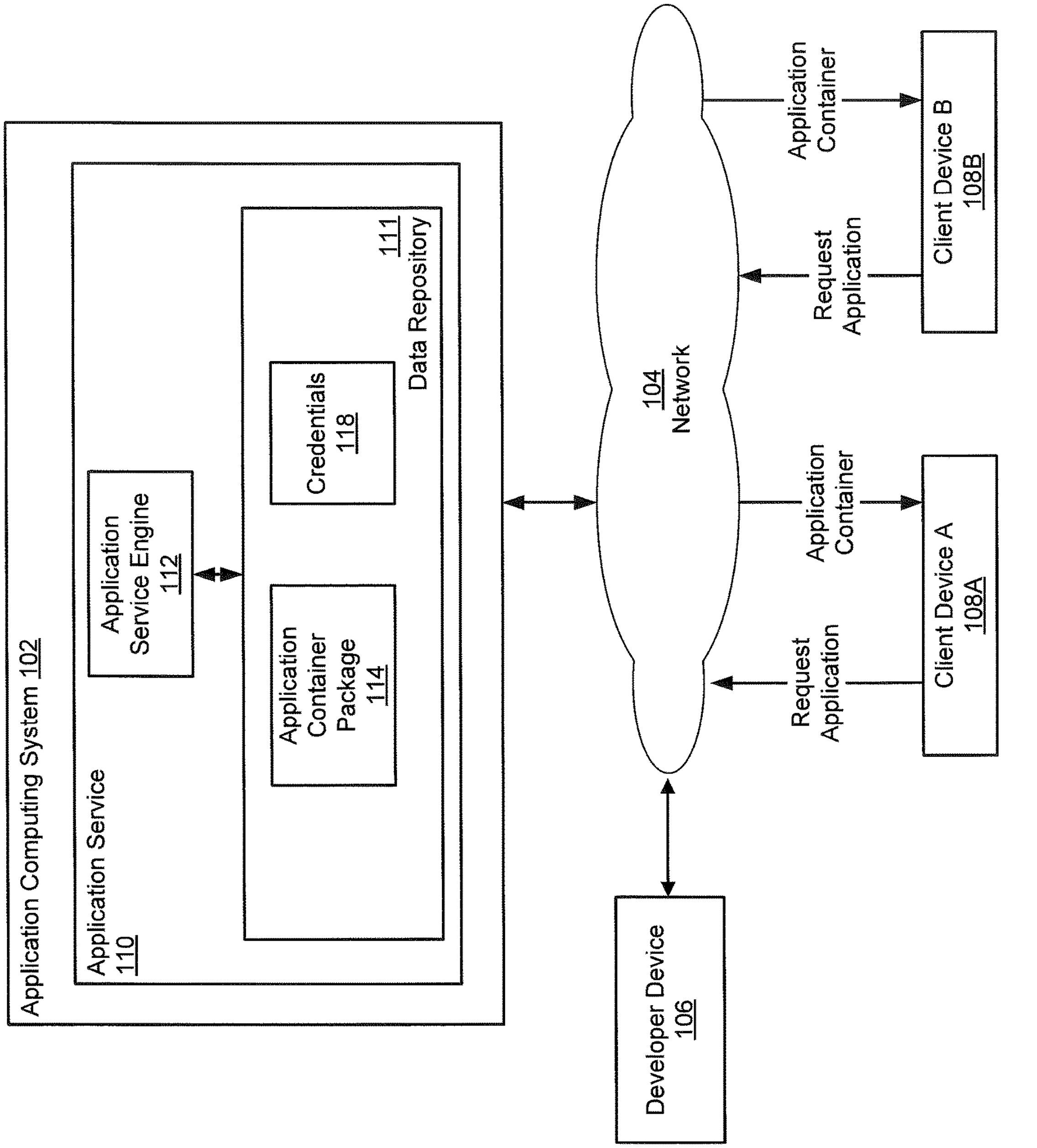
FIG. 1 shows an example system in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to delivering software applications and software application content to client devices. In other words, in one or more embodiments, developers send software applications to an application service that delivers the software applications to the client devices. When a client device is testing the software application, the client device may use the full production version of the software application, but through an application container that is provided by the application service. The application container defines an interface through the software application and may include functionality to store feedback from the client device. When the client device wants to use the software application, such as by purchasing the software application, the same full production version may be transmitted to the client device. Prior to sending the same full production version, the developer may update the version according to the feedback.

FIG. 1 shows an example system in accordance with one or more embodiments of the technology. As shown in FIG. 1, the system includes an application computing system (102), a network (104), a developer device (106), and one or more client devices such as Client Device A (108A) and Client Device B (108B). Each of these components is described below. The various computing systems shown in FIG. 1 may correspond to one or more of the computing systems shown in FIGS. 9.1 and 9.2.

In one or more embodiments of the technology, a developer device (106) is any computing system having functionality to develop software applications. As used herein, a developer of a software application is any user, company, or other entity that directly or indirectly develops a software application. For example, the developer may be the software developer that writes the application code, a company that contracts with another to write the application code, or another entity that directly or indirectly develops the software application code. In one or more embodiments in accordance with FIG. 1, more than one developer device (106) may exist that may be used to develop one or more software applications, jointly or separately. For example, the application computing system (102) may provide functionality to multiple developers, who may or may not be related to each other.

In one or more embodiments of the technology, client devices (108A) and (108B) may be any computing system having functionality to execute one or more software applications (e.g., Application Container Package (114)). The client device may execute the software application directly or indirectly such as in a web browser or other client application. In one or more embodiments, the client devices (108A) and (108B) may operate a particular operating system. For example, in one or more embodiments Client Device A (108A) may be a smartphone, smart watch, or personal digital assistant (PDA) of a particular platform and Client Device B (108B) may be a smartphone of a different platform. A user as used herein is a user of the client device. For example, the user may be an individual using the software application via the client device. The user may be a tester and/or an end user.

In one or more embodiments of the technology, the developer device (106), and the client devices may be operatively connected to the application computing system (102). Connection between the developer device (106), the client devices, application computing system (102) may be via a network (104). In one or more embodiments, the network (104) may be a local area network (LAN), a wide area network (WAN) such as the Internet, telecommunications network, or any other type of network or combination of networks.

In one or more embodiments of the technology, an application computing system (102) executes one or more application service(s) (110). The application computing system (102) may correspond to one or more computing systems that include functionality to store and deliver software applications by way of the application service (110). For example, the application computing system (102) may include functionality to perform one or more of the steps described in FIGS. 3 and 4 below.

In one or more embodiments of the technology, the application service (110) includes an application service engine (112) and a data repository (111). The data repository (111) is any type of storage unit and/or device (e.g., a file system, database, collection of tables, or any other storage mechanism) for storing data. Further, the data repository (111) may include multiple different storage units and/or devices. The multiple different storage units and/or devices may or may not be of the same type or located at the same physical site. In one or more embodiments, the data repository (111) includes functionality to store Application Container Package(s) (114) and Credentials (118).

In one or more embodiments, the Credentials (118) may include credentials for one or more developers (i.e., developer credentials) and/or credentials for one or more users (i.e., user credentials). In general, a credential is any identifier that authenticates a user or developer to the software application. For example, a credential may be username and password, a biometric key, an encrypted code, or other authentication identifier. The user credentials may include one or more end user credentials. An end user credential is a credential associated with an end user account to authenticate the end user to the software application. Additionally or alternatively, the user credentials may include one or more test credentials for a user to test the software application. The test credentials may be related to one or more test accounts that allow an end user to anonymously test the software application. The test credential may appear to the software application as an end user credential to use the software application, but may be used by multiple end users and/or may be associated with dummy data in an account.

Additionally, in one or more embodiments, the Credentials (118) may be associated to other access information. For example, in one or more embodiments, credentials may be used to restrict access to certain screens, interfaces, or data within an software application. Additionally, in one or more embodiments, credentials may specify a timeout or a trial period after which a user is no longer allowed access to an software application.

In one or more embodiments, Application Container Package (114) may include the Application Container Packages generated by the application service engine (112). Additional detail about Application Container Packages is described in FIG. 2 below.

In one or more embodiments, the application service engine (112) corresponds to hardware, software, firmware or any combination thereof that performs the functionality of the application service (110). In other words, the application service engine (112) may manage Application Container Packages. Specifically, the application service engine (112) receives software applications from developer devices and generates application container packages (See e.g. FIG. 3). Additionally, in one or more embodiments, the application service engine (112) services software application requests from one or more client devices to deliver software applications and/or software application content to the one or more client devices and receive input from the one or more client devices (See e.g. FIG. 4). Furthermore, in one or more embodiments, the application service engine (112) services developer device requests for application metadata (See e.g. FIG. 6).

Figure 2:
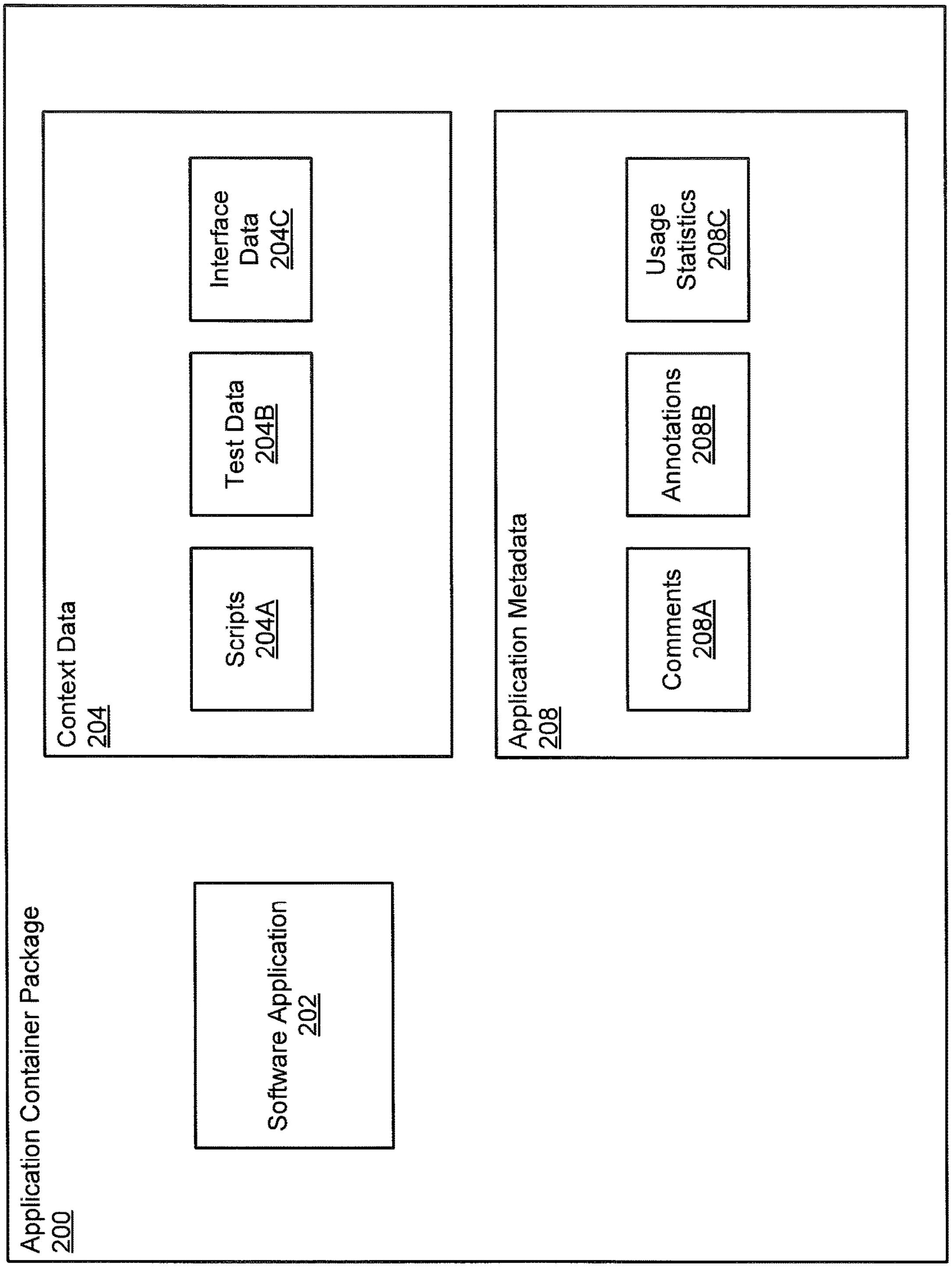
FIG. 2 shows an example application container package in accordance with one or more embodiments of the technology.

FIG. 2 shows an example application container package in accordance with one or more embodiments of the technology. As shown in FIG. 2, one or more embodiments of an Application Container Package (200) has a Software Application (202), Context Data (204), and Application Metadata (208). In one or more embodiments the Software Application (202) is the production executable code for a software application. A software application is any collection of executable instructions that may be executed by a computing system processor, such as the processor shown in FIGS. 9.1 and 9.2. The software application may be configured to execute locally on a computing system that presents the interface or, at least partially, remotely from the computing system that presents the interface. For example, the software application may be a mobile device application, a web application, or any other type of software application. In one or more embodiments of the technology, the software application is a production version. In other words, the software application is a version intended by the developer to be a final, stable release of the software application. For example, the developer may define the production version as lacking bugs known by the developer and having complete functionality. Thus, the production version of the software application may be a version that end users may purchase or otherwise acquire. Moreover, the production version of the software application is not a test version of the software application. Multiple production versions of the software application may exist for different editions of the software application. For example, a separate production version may exist for a personal use edition, an enterprise edition, a standard edition, a student edition, or any other edition. In one or more alternative embodiments, the Software Application (202) may also include source code, test code, or debugging code.

In one or more embodiments, the Context Data (204) stores Scripts (204A), Test Data (204B), and Interface Data (204C). Scripts (204A) may include one or more scripts for the execution of the software application stored in the Software Application (202) data. For example, in one or more embodiments a script may include configuration data for the initialization of the software application. Additionally, a script may provide a particular path through the execution of an software application. For example, in one or more embodiments, a script may lead a user of a client device through particular screens or user interface elements (e.g., user interface widgets) as selected by the developer of the software application. In other words, in one or more embodiments the developer may customize the experience of the user to, for example, solicit feedback or gather statistics on different paths through the software application.

Further, in one or more embodiments, Context Data (204) may be used to capture various states of the software application. For example, a developer may wish to capture data related to crashes, such as the options or interface elements with which a user is interacting at the time of the crash, and any data submitted by the user prior to the crash. Additionally, in one or more embodiments, Context Data (204) may include state information (e.g., bookmark defining a location such as current page and/or widget in the software application, data submitted to the software application, and any other state information) for the user. In such a scenario, the user may use the state information save a current state in a particular interface to return to the same state at a later time.

In one or more embodiments, the Test Data (204B) stored in the Context Data (204) may include various data to be made available to the software application at execution. For example, in one or more embodiments the data may be dummy data for populating fields within an software application. In other words, the test data may be available to the software application for the sake of completeness of functionality. The same test data may be defined for multiple users of the software application, such as to test the software application. For example, the test data may be associated with a test account that is accessed by multiple users. Alternatively, in one or more embodiments a user may fill out fields in the software application and thus, generate or modify test data that is stored in Test Data (204B). Additionally, particular test data may be associated with a particular user that is cross-referenced from credentials.

In one or more embodiments, the Interface Data (204C) stored in the Context Data (204) may include various data to be used by the Application Service Engine to generate platform agnostic interfaces for the Software Application (202). In other words, an interface may be deemed agnostic when the interface may be displayed on any client device regardless of platform. In other embodiments, the interface may be deemed agnostic when the interface is displayed on a subset of client devices (e.g., mobile devices or desktop devices). For example, in one or more embodiments the interface data may be the graphical or other interface elements and the relative or absolute locations of the graphical or interface elements on a particular interface. Additionally, in one or more embodiments, the interface data may include cross-references to Scripts (204A) and/or Test Data (204B). In other words, in one or more embodiments, the interface data may cross-reference to a script to disable or enable various interface elements to guide a user to select certain options. Further, in one or more embodiments, interface data may be referenced to particular test data to populate specific fields.

In one or more embodiments, Application Metadata (208) may store Comments (208A), Annotations (208B), and Usage Statistics (208C). Specifically, Comments (208A) may store one or more user generated comments. In one or more embodiments, users may store in the comments feedback or other notes as the user uses the software application. Similar to Scripts (204A), Test Data (204B), and Interface Data (204C) above, comment data stored in Comments (208A) may be associated with various test users credentials.

In one or more embodiments, Annotations (208B) may include one or more user generated annotations that are related to particular user interface elements. Specifically, as users interact with the software application (Software Application (202)), the users may provide markings on the user interface to provide feedback, above. The markings provided by the user may be annotations. For example, a user may draw an arrow to a particular user interface element or to where the user may believe an optimal placement for the user interface element may be. Similarly, the user may indicate that they “like” or “dislike” a particular interface element. Similar to Comments (208A), in one or more embodiments annotation data stored in Annotations (208B) may be associated with various test user credentials.

In one or more embodiments, Usage Statistics (208C) stores one or more statistical data about user interactions with the software application. Specifically, in one or more embodiments statistical data may include the length of time a user spends on a particular screen, the number of visits to each screen, the most frequently visited screens, most common navigation paths through the app, the number of button presses for a particular button, or processor and memory load statistics. In other words, Usage Statistics (208C) may store any data that might be useful to the developer of the software application that is gathered by users interacting with the software application. Similar to Comments (208A) and Annotations (208B), in one or more embodiments, annotation data stored in Usage Statistics (208C) may be associated with various test user credentials.

While FIGS. 1-2 show a configuration of components, other configurations may be used without departing from the scope of the technology. For example, various components may be combined to create a single component. As another example, the functionality performed by a single component may be performed by two or more components. For example, the application metadata may be stored separately from the application container package, the credentials may be stored in the application container package, or other storage structures of data may exist. By way of another example, the application computing system and the developer device may be the same device.

While the various steps in the following flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

Figure 3:
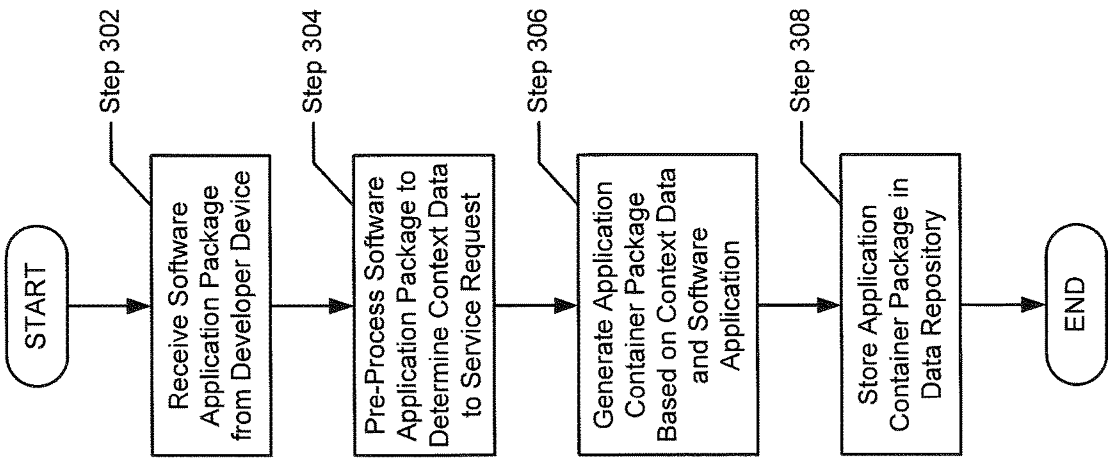
FIG. 3 shows an example method for generating application container packages in accordance with one or more embodiments of the technology.

FIG. 3 shows an example method for generating application container packages in accordance with one or more embodiments of the technology. The method shown in FIG. 3 may be implemented, for example, using the system shown in FIG. 1.

Turning to FIG. 3, in step 302, the Application Service Engine receives a software application package from a developer device. In one or more embodiments, the Application Service Engine may first authenticate a developer’s credentials against the credentials repository before accepting the package. Additionally, in one or more embodiments, the software application package may include the executable software code (i.e. the software application or app) and one or more of the following: user credentials, scripts, and/or test data.

In step 304, the Application Service Engine pre-processes the software application package to determine the context data to service the request. In other words, in one or more embodiments the Application Service Engine determines the contents of the software application package and whether credentials and metadata are stored separately or within an application container package. Furthermore, the Application Service may determine that certain scripts or processes should be run to prepare the software application for users.

In one or more embodiments, the Application Service Engine may pre-process the software application package to determine data that may be required to generate platform agnostic interfaces for the software application. In other words, the Application Service Engine may analyze the software application for various user interface elements such as buttons, text fields, drop-down menus, radio buttons, or any other user interface elements that a user may interact with. In one or more embodiments, the Application Service Engine may generate additional context data related to the interface elements for serving the software application to client devices.

In one or more embodiments, the Application Service Engine may execute the software application in order to gather the abovementioned context data. In one or more embodiments, the Application Service Engine may utilize virtual machines to execute the software application on a platform specific to the software application. In other words, the Application Service Engine may step through the path for each interface of the software application to capture graphical information or screen elements. In one or more embodiments, the Application Service Engine may capture screenshots or other graphical elements from the software application. Additionally, the Application Service Engine may capture information about each graphical element such as, for example, the relative or absolute location of the element within the interface (e.g. X and Y coordinates).

Furthermore, in one or more embodiments, the Application Service Engine may generate one or more structure data containers to store interface information. For example, the application service engine may generate an eXtensible Markup Language (XML) container that indexes the various graphical or interface elements and the element's respective locations and/or functions. Alternative examples of structured data containers include, but are not limited to, HyperText Markup Language (HTML) and Cascading Style Sheets (CSS).

Additionally, in one or more embodiments, the developer may provide context data necessary to generate a platform agnostic interface for the software application. Specifically, the developer may provide structured data indicating graphical elements, interactive elements (e.g. buttons, text fields, etc.), functions, and/or location information. As discussed above, structured data may include XML, HTML, CSS, or any other type of container for defining the various elements that make up the interface of the application.

In one or more embodiments, the Application Service Engine may use a combination of developer provided context data along with context data generated by analysis of the software application (e.g., executing the software application or otherwise capturing context data from the app). Specifically, in one or more embodiments, the Application Service Engine may aggregate generated context data with the developer provided context data to be stored.

In step 306, the Application Service Engine generates an Application Container Package based on the software application package, the context data provided by the developer, and any additional context data generated by the Application Service Engine. In other words, the Application Service Engine creates an Application Container Package and stores the software application and the context data into the respective repositories within the Application Container Package.

In step 308, the Application Service Engine stores the generated Application Container Package in the data repository and the process ends. In one or more embodiments, the Application Service Engine may return a status code to the developer device indicating success or failure of the generation and storage procedure (i.e. steps 304 and 306). Additionally, in one or more embodiments, the Application Service Engine may flag or otherwise advertise the new Application Container Package as available to client devices for delivery.

Figure 4:
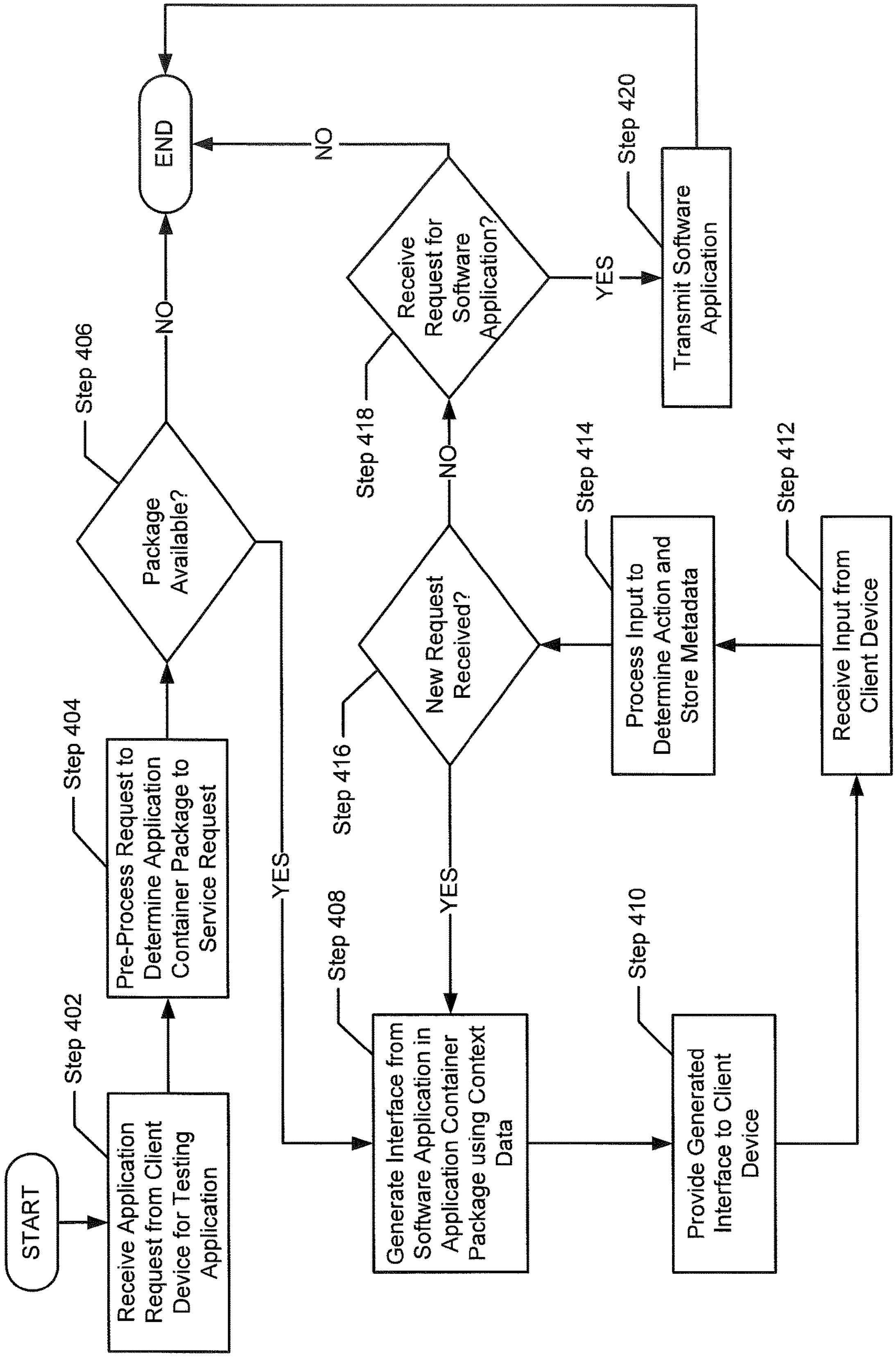
FIG. 4 shows an example method for servicing application requests in accordance with one or more embodiments of the technology.

FIG. 4 shows an example method for servicing application requests in accordance with one or more embodiments of the technology. The method shown in FIG. 4 may be implemented, for example, using the system shown in FIG. 1.

Turning to FIG. 4, in step 402, the Application Service Engine receives a software application request from a client device. In step 404, the Application Service Engine preprocesses the software application request to determine the Application Container Package to service the request. In other words, the Application Service Engine determines whether there is an Application Container Package within the data repository that includes the software application requested by the client device. In one or more embodiments, the Application Service Engine may also verify the user credentials of the client device.

In step 406, the Application Service Engine determines whether the Application Container Package exists to service the request. If the package is not available, the Application Service Engine notifies the client device and the process ends. Additionally, in one or more embodiments, the Application Service Engine may also determine that the user does not have the proper credentials, deny the request, and end the process.

If the package does exist, the process proceeds to step 408 and the Application Service Engine generates an interface from the selected Application Container Package using the Context Data and the production version of the software application stored in the package. Specifically, in one or more embodiments, the Application Service Engine may generate a platform agnostic interface so that the client device may interact with the software application. In one or more embodiments, the platform agnostic interface may be a HTML interface. In other words, the Application Service Engine may generate an interface that may be accessed by a client device's web browser or other client application. Alternatively, in one or more embodiments, the Application Service Engine may generate the interface from one or more other context data, such as for example XML or CSS.

As discussed above, in one or more embodiments, the Application Service Engine may have generated and/or received from the developer various context data relating to the graphical elements and interactive elements of each interface in a software application. Specifically, in one or more embodiments, the Application Service Engine may arrange the various graphical elements and interactive elements on a generated interface based on stored Context Data. Thus, in one or more embodiments, the Application Service Engine generates a new, platform agnostic, interface based upon the software application and the software application's corresponding Context Data.

Further, in one or more embodiments, the Application Service Engine may use one or more scripts stored in the Context Data of the Application Container Package to select the sequence of interfaces or interface elements to display to the user. Additionally, in one or more embodiments, the Application Service Engine may populate data within the generated interface based upon test data stored in the Context Data. As discussed above, in one or more embodiments, particular Context Data may be associated with a particular user, which may be referenced against Credentials stored in the Application Container Package.

Additionally, in one or more embodiments, the scripts or other Context Data may specify that particular fields or interface elements are displayed, but disabled. For example, in one or more embodiments, a developer may want to lead a user toward a particular interface or interface selection by disabling certain graphical elements and/or interactive elements and enabling various other graphical elements and/or interactive elements on the interface. As discussed above, the developer defines the script accordingly, and the script is then used to generate the interface that leads the user through the application as desired by the developer.

In step 410, the Application Service Engine provides the generated interface to the client device. In other words, the Application Service Engine may transmit the interface via the network to the client device. A web browser or other client application on the client device may present the interface to the user of the client device. Presenting the interface may be via audio, visual, haptic, or any combination thereof. In step 412, the Application Service Engine receives input from the client device. The input may be submitted by the user (e.g., information submitted to one or more user interface elements, annotations, comments, etc.), captured state information, and user statistics.

In step 414, the Application Service Engine processes the input from the client device to separate actionable input from metadata. The actionable input is input that triggers generation of a new interface, such as data in a user interface element, a selection of a user interface element, or other input. In one or more embodiments, the Application Service Engine processes any separated metadata in the form of comments, annotations, and/or usage statistics and stores the processed metadata in the data repository. The Application Service Engine may generate a reference to, for example, user credentials of the user of the client device to associate any generated data with a particular user.

In one or more embodiments, the Application Service Engine may receive debugging data from the client device. In other words, in one or more embodiments, the Application Service Engine may receive data related to the runtime variables of the application, the contents of the memory that the interface is occupying, a screenshot of the interface, user input data relating to which interface elements the user was interacting with, the type of bug encountered (e.g. fatal crashes, non-fatal crashes, a particular interface element not working as expected, or a calculation error), user comments on the bug, or an exit code generated by the interface.

In one or more embodiments, a developer of the software application may fix bugs, add features, or otherwise make updates to the software application. Additionally or alternatively, the developer of the software application may move interface elements, change or fix functionality, or otherwise update the software application according to comments or annotations received from the end user. In one or more embodiments, the developer of the software application may change or otherwise update the software application based on usages statistics of the software application. Thus, in one or more embodiments, the Application Service Engine may receive a new production release of the software application to store in the Application Container Package.

In step 416, the Application Service Engine determines whether any actionable input was received from the client device (i.e. a new interface request). If Application Service Engine determines that a new request has been received, the Application Service Engine proceeds back to step 408 to generate an interface based upon the input from the user (e.g. proceeding to a different screen or moving user interface elements). In one or more embodiments, the Application Service Engine may generate a new interface based on the availability of a new production version of the software application. Alternatively, if the Application Service Engine determines that no actionable input requests are received, the process proceeds to step 418.

In step 418, the Application Service Engine determines whether a request for the production version of the software application is received. In one or more embodiments, the request may be a request from the end user to purchase or otherwise acquire the production version of the software application. In one or more embodiments, the Application Service Engine may determine whether the end user is authorized to acquire the application. For example, the Application Service Engine may determine whether the end user has successfully paid for the application or if one or more credentials supplied by the end user are authorized to acquire the software application. If the Application Service Engine determines that no request is received, the process ends.

If the Application Service Engine determines that the end user has requested the production version of the software application and the request is approved the process proceeds to step 420. In step 420, the Application Service Engine transmits the production version of the software application to the client device and the process ends.

Figure 5:
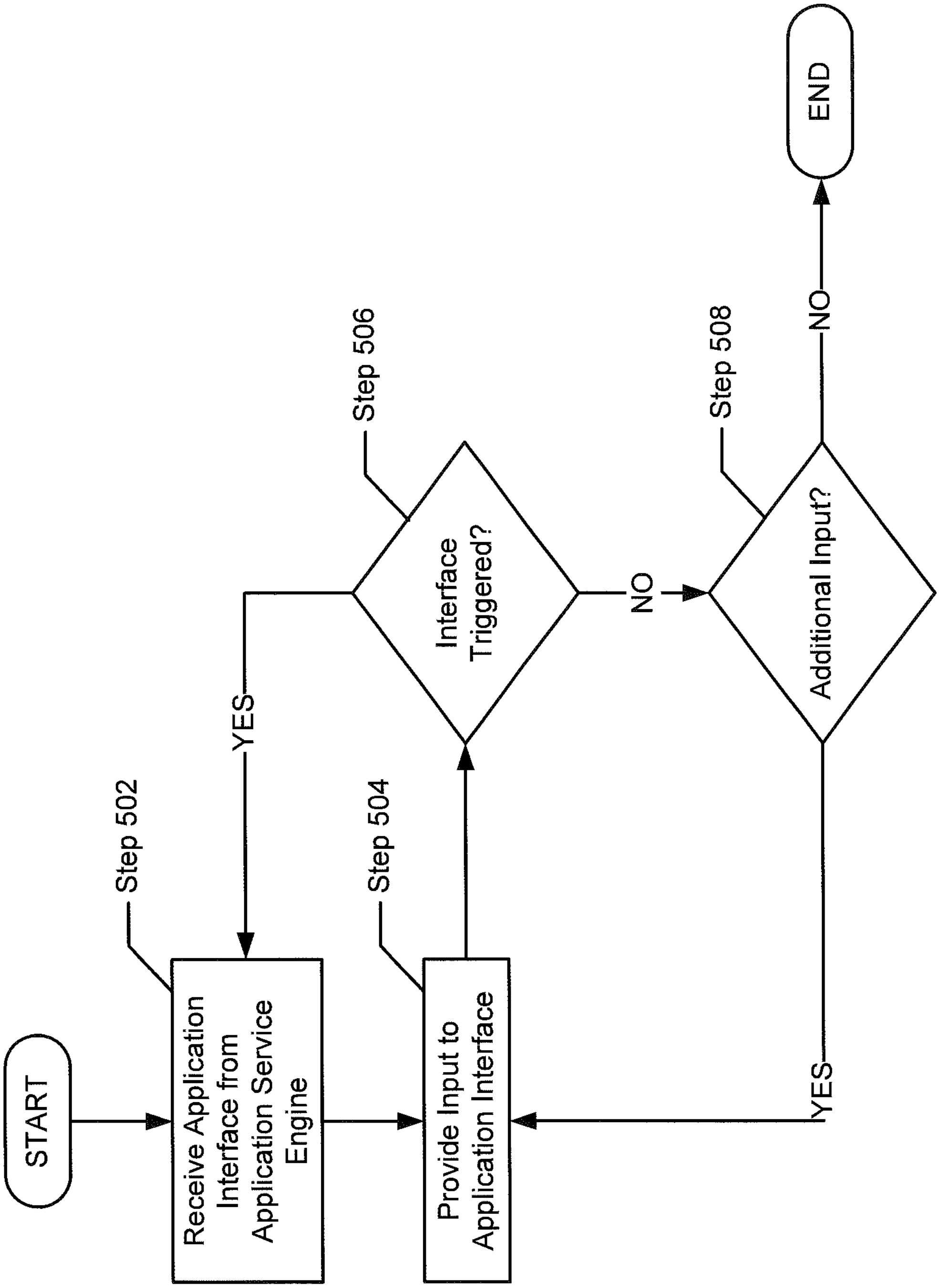
FIG. 5 shows an example method for requesting applications in accordance with one or more embodiments of the technology.

FIG. 5 shows an example method for requesting software applications in accordance with one or more embodiments of the technology. The method shown in FIG. 5 may be implemented, for example, using the system shown in FIG. 1.

Turning to FIG. 5, in step 502 the client device receives an application interface from the Application Service Engine. In one or more embodiments, the user of the client device may interact directly with one or more user interface elements in the application interface. Additionally, the user of the client device may provide comments or annotations on the displayed application interface. As discussed above, in one or more embodiments, a path through the application interface may be scripted and thus, certain options or user interface elements may be deactivated to guide the user toward a particular selection. In one or more embodiments, the interface received by the client device allows a user to interact with a software application prior to purchasing, downloading, or otherwise acquiring the production version of the software application.

In step 504, the user of the client device provides input to the application interface. In one or more embodiments, the user may comment or annotate the interface thereby providing feedback. Thus, in one or more embodiments, the user may interact with and provide feedback prior to purchasing, downloading, or otherwise acquiring the production version of the software application. Additionally, the user may specify interface elements, certain functionality, or any other aspects of the software application that the user likes or dislikes. Thus, in one or more embodiments, whether or not the user decides to acquire the production version of the software application, the user has an opportunity to interact with the software application and provide feedback. Additionally or alternatively, the user may decide to acquire the production version of the software application based upon updates or changes made to the production version of the software application influenced by feedback from the user or one or more other users.

In step 506, a determination is made as to whether changes to the application interface have been triggered. If the interface is triggered, the process returns to step 502 and the client device receives a new or updated interface from the Application Service Engine. As discussed above, in one or more embodiments, a new production version of the software application may become available. Thus, in one or more embodiments, the client device may receive a new or updated interface based on the new production version of the software application. If the interface is not triggered, the process proceeds to step 508.

In step 508, a determination is made as to whether the user provides additional input to the application interface. Additionally, in one or more embodiments, the application interface may also be at the end of operation in which no further input is possible. If the determination is made that no further input is desired or required, the process ends. If the determination is made to make further input, the process proceeds back to step 504.

Figure 6:
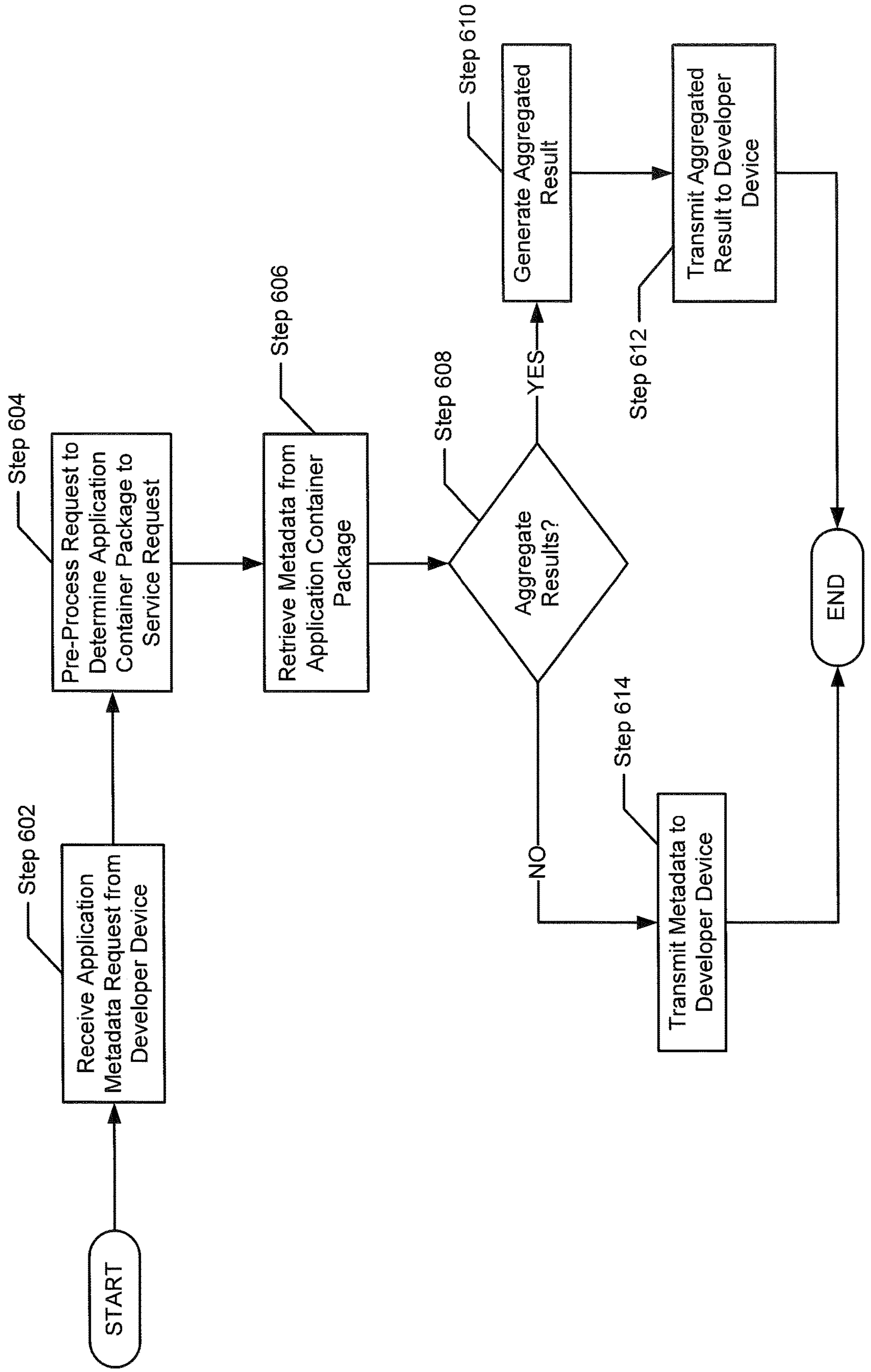
FIG. 6 shows an example method for requesting application data in accordance with one or more embodiments of the technology.

FIG. 6 shows an example method for requesting application data in accordance with one or more embodiments of the technology. The method shown in FIG. 6 may be implemented, for example, using the system shown in FIG. 1.

Turning to FIG. 6, in step 602 the Application Service Engine receives a request for metadata from a developer device. In step 604, the Application Service Engine pre-processes the request to determine the Application Container Package to service the request. In other words, the Application Service Engine determines the Application Container Package within the data repository that contains the software application referenced by the metadata request of the developer device. In one or more embodiments, the Application Service Engine may also verify the developer credentials of the developer device.

In step 606, the Application Service Engine retrieves the requested metadata from the selected Application Container Package. As discussed above, in one or more embodiments, the metadata may include data relating to user comments, annotations, or various other usage statistics. The Application Service Engine may query the data repository for the metadata from the Application Container Package.

In step 608, the Application Service Engine determines whether the resulting metadata requested by the developer device needs to be aggregated. If aggregation is required, the Application Service Engine proceeds to step 610. In step 610, Application Service Engine aggregates the metadata to produce an aggregated result. In one or more embodiments, the Application Service Engine performs aggregation by concatenating the retrieved metadata. In one or more embodiments, the Application Service Engine performs aggregation by calculating one or more statistics based on the retrieved metadata. For example, the Application Service Engine may calculate time spent on each page, a number of paths through the software application, the percentage of time that one or more particular paths are chosen, the amount of computational or storage resources consumed by the software application, or any other statistics derived from the metadata. In one or more embodiments, the Application Service Engine performs aggregation by combining metadata across multiple users. Alternatively or additionally, the Application Service Engine may perform aggregation by combining metadata from multiple access of the software application by the same user. In step 612, the Application Service Engine transmits the aggregated result to the developer device and the process ends.

In the case that aggregation is not required, the process proceeds to step 614. In step 614, the Application Service Engine transmits the metadata to the developer device and the process ends.

FIG. 7.1 shows an example in accordance with one or more embodiments of the technology.

In this example, a mobile banking application is requested by a user of a mobile device. The mobile banking application has been provided to an Application Service Engine by a developer and stored in an Application Container Package (See e.g. FIG. 3). For the purposes of this example, test user credentials, test data, and a script are included with the software application package transmitted to the Application Service Engine.

The Application Service Engine services the application request by providing the interface depicted in FIG. 7.1. The user of the mobile device provides the "TestUser1" username along with a password. Alternatively, in one or more embodiments, the username and password fields may be pre-populated based upon a script or other test data.

Continuing from the example of FIG. 7.1, FIG. 7.2 shows comments added by the user of the mobile device. Specifically, in the example according to FIG. 7.2, the user has added a suggestion for the developer to add a checkbox that allows the application to remember a particular set of credentials for future logins. Further, the user of the mobile device has also added a suggestion to add a "CLEAR" button for clearing the authentication fields. In one or more embodiments, the user of the mobile device may add further comments or annotations to the interface before proceeding. In one or more embodiments, when the user has finished commenting on the interface, the user selects the "LOGIN" button to proceed to the next interface.

Continuing from the example of FIG. 7.2, based upon the entered credentials and the "LOGIN" button being selected, the Application Service Engine authenticates the user and processes the login input. The Application Service Engine services the input request by storing the metadata (i.e. the comments) provided by the user and generating a new interface as shown in FIG. 7.3.

For the purposes of this example, assume that the "Make Deposit" button and the "Logoff" button have been greyed out, thus indicating to the user that the buttons are deactivated. In this way, a script provided by the developer may guide the user toward selecting the "Balances" button. Notably, however, the production version of the software application has full functionality of the deactivated buttons. However, the interface that is generated based on the script has the functionality deactivated. Thus, by merely specifying the script, the developer may guide the user without having to adjust or otherwise change the production version. Having only one choice, the user selects the "Balances" button to proceed to the next interface. However, in one or more embodiments, the developer may provide alternative options to the user or may present all of the available options to the user and monitor the selections by the user to gather usage statistics.

Continuing from the example of FIG. 7.3, based upon the "Balances" button being selected, the Application Service Engine services the input request by storing the metadata (i.e. none in this case) provided by the user and generating a new interface as shown in FIG. 7.4. In the new interface, the user is presented with a display of the account balances. In one or more embodiments, the account balances may be based upon test data provided by the developer. In one or more embodiments, the account balances may be based upon previous interactions with the user.

For the purposes of the example in 7.4, assume that the user has provided comments relating to the readability of the values. Specifically, assume that the user has added a comment suggesting that the developer add commas to the account balance values to make them more readable. Further, assume that the user has also drawn an arrow, thereby annotating a suggestion on the interface. The Application Service Engine receives the comments and the annotation and stores them in the metadata repository. When the developer later accesses the system, the developer may retrieve the comments and annotations and update the production version.

FIG. 8.1 shows an example in accordance with one or more embodiments of the technology. In the example in FIG. 8.1, a restaurant software application is requested by a user of a client device. The restaurant software application has been provided to an Application Service Engine by a developer and stored in an Application Container Package (See e.g. FIG. 3). For the purposes of this example, test data, context data, and a script are included with the software application package transmitted to the Application Service Engine.

The Application Service Engine services the application request by providing the interface depicted in FIG. 8.1. For the purposes of this example, assume that the "Contact" button and the "Hours" button have been greyed out, thus indicating to the user that they are deactivated. In this way, a script provided by the developer may guide the user toward selecting the "Menu" button. Having only one choice, the user selects the "Menu" button to proceed to the next interface. However, in one or more embodiments, the developer may provide alternative options to the user or may present all of the available options to the user and monitor the selections by the user to gather usage statistics.

Continuing from the example of FIG. 8.1, based upon the "Menu" button being selected, the Application Service Engine services the input request by storing the metadata (i.e. none in this case) provided by the user and generating a new interface as shown in FIG. 8.2. In the new interface, the user is presented with a display of menu options available. In one or more embodiments, the menu items may be based upon test data provided by the developer. Further, in one or more embodiments, a script provided by the developer pre-selects a "Lunch" menu from a drop-down menu selection. However, in one or more embodiments, the developer may pre-select a different option, such as "Dinner," or pre-fill the drop-down menu with an indicator that the user should select an option such as "Please select a menu."

For the purposes of this example, assume that the user has provided comments and annotations relating to the menu. Specifically, assume that the user has added a comment suggesting that the developer add food allergy or preference information to the menu. In this example, the user indicates that it would be useful to know if, for example, a menu item is gluten free (GF), may include peanuts, or is suitable for vegetarians. Further, assume that the user has also provided a comment relating to allowing users to provide reviews or ratings on various menu items. The user has further annotated the interface by drawing a star as a suggestion for a rating system for the menu items. Additionally, the user has also annotated a smiling face next to the dropdown menu indicating that they "like" this feature of the interface. The Application Service Engine receives the comments and the annotation and stores them in the metadata repository.

Continuing from the example of FIG. 8.2, FIG. 8.3 shows an example XML representation of the application container package after a user has interacted with the application. As shown in FIG. 8.3, the application container package has a package identifier that provides a unique way for the Application Service Engine to identify and select the application container package. In one or more embodiments, the Application Service Engine may generate or the developer may provide a unique identifier such as, for example, a Universally Unique Identifier (UUID) or a Globally Unique Identifier (GUID).

Additionally, the application container package has developer generated context data along with context data generated by the Application Service Engine. In this example, the developer has provided interface data relating to the buttons on the interface shown in FIG. 8.3. However, the developer did not provide the information for the dropdown selection box or the title block for the interface. Therefore, the Application Service Engine generated an additional interface data container to instantiate the dropdown selection box and the title block interface elements. Furthermore, upon analyzing the interface, the Application Service Engine determined that "Lunch" is the default option for the application (i.e. the software application shows "Lunch" first or the developer provided a script that selects the "Lunch" option) and changed the flags in the dropdown selection box such that "Lunch" is selected (i.e. selected="true") by default.

Furthermore, in one or more embodiments in accordance with FIG. 8.3, the user has provided feedback as can be seen in FIG. 8.2. In other words, the Application Service Engine has received comments and annotations from the user and stored them in a metadata container associated with the user, which in this case is "testuser1." Each of the comment data fields include the text of the comment from the user. In one or more embodiments, the comment data fields may also include fields related to, for example, the location of the comment within the interface or the interface element being commented on.

Additionally, the metadata includes two annotations: a freeform annotation and a "like" annotation. Specifically, the freeform annotation is a star drawn on the interface by the user in a freeform fashion. An image of the freeform star annotation is saved in the blob data associated with the annotation. Further, location data specifies the X and Y coordinates of the annotation on the interface.

The second annotation is the "like" annotation represented by a smiling face on FIG. 8.2. In other words, the user has indicated that they "like" the dropdown box for displaying different menus. In one or more embodiments, the user may also specify that they "dislike" a particular element. Further, in one or more embodiments, the graphical representation of "like" or "dislike" may be any other indicative image such as, for example, a thumbs up or a thumbs down. In one or more embodiments, the representation for the "like" or "dislike" indications may be text instead of graphical.

The application container package also has the restaurant software application itself. In one or more embodiments, the restaurant software application may be represented by a data blob. In this case, the container for the restaurant software application has a field for the blob referencing the location of the production version of the software application.

Continuing from the examples depicted in FIGS. 8.1-8.3, FIG. 8.4 shows a non-fatal bug example scenario in which the user has selected menu items from the restaurant software application and has proceeded to a checkout interface in which the total cost for the order is calculated and displayed. On the checkout interface, the items that the user has selected are shown along with a button to Purchase the selected items and a button to Return to a previous interface. In this example, the user has selected the salad for $4.00 and the chicken sandwich for $5.00. In other words, in this example the total cost of the selected items before tax is $9.00.

Assume for the sake of this example, that the tax rate for transactions in the ABC Restaurant software application is 10%. Therefore, the proper calculation of the tax on the transaction for the items selected by the user is $0.90. However, the ABC Restaurant application improperly calculated or performed a rounding error by indicating that the tax as $1.00.

Therefore, in this example the user has provided a comment noting that the tax has been incorrectly calculated. The user has also indicated that the calculation for the total is incorrect based on the other bug relating to the tax. In this way, the user provides feedback for the developer by pointing out deficiencies in the application that may or may not be related.

Embodiments of the technology may be implemented on a computing system. Any combination of mobile, desktop, server, router, switch, embedded device, or other types of hardware may be used. For example, as shown in FIG. 9.1, the computing system (900) may include one or more computer processor(s) (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores, or micro-cores of a processor. The computing system (900) may also include one or more input device(s) (910), such as a touchscreen, keyboard, mouse, microphone, touchpad, electronic pen, or any other type of input device.

The communication interface (912) may include an integrated circuit for connecting the computing system to a network (not shown) (e.g., a local area network (LAN), a wide area network (WAN) such as the Internet, mobile network, or any other type of network) and/or to another device, such as another computing device.

Further, the computing system (900) may include one or more output device(s) (908), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The input and output device(s) may be locally or remotely connected to the computer processor(s) (902), memory (904), and storage device(s) (906). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform one or more embodiments of the technology.

The computing system (900) in FIG. 9.1 may be connected to or a part of a network. For example, as shown in FIG. 9.2, the network (920) may include multiple nodes (e.g., node X (922), node Y (924)). Each node may correspond to a computing system, such as the computing system shown in FIG. 9.1, or a group of nodes combined may correspond to the computing system shown in FIG. 9.1. By way of an example, embodiments of the technology may be implemented on a node of a distributed system that is connected to other nodes. By way of another example, embodiments of the technology may be implemented on a distributed computing system having multiple nodes, where each portion of the technology may be located on a different node within the distributed computing system. Further, one or more elements of the aforementioned computing system (900) may be located at a remote location and connected to the other elements over a network.

Although not shown in FIG. 9.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system shown in FIG. 9.1. Further, the client device (926) may include and/or perform all or a portion of one or more embodiments of the technology.

The computing system or group of computing systems according to FIGS. 9.1 and 9.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces, or communication channel end-points, enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to server process. Upon receiving the data request, the server process analyzes the request and gathers the requested data. Finally, the server process then generates a reply including at least the requested data, and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment, by one process, may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the technology. The processes may be part of the same or different application, and may execute on the same or different computing system.

Rather than or in addition to sharing data between processes, the computing system performing one or more embodiments of the technology may include functionality to receive data from a user. For example, in one or more embodiments, a user may submit data via a graphical user interface on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from local memory by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system in performing one or more embodiments of the technology may extract one or more data items from the obtained data. For example, the extraction may be performed as follows by the computing system in FIG. 9.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string, or may be a query presented to a structured data repository (where the data repository may be organized according to a database schema or data format, such as XML).

The extracted data may be used for further processing by the computing system. For example, the computing system of FIG. 9.1 while performing one or more embodiments of the technology may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate if the numerical result is a positive number, a negative number, zero, etc. By selecting the proper opcode and then reading the numerical results and/or status flags, the comparison may be executed. For example, in order to determine if A>B, B may be subtracted from A (i.e., A–B), and the status flags may be read to determine if the result is positive (i.e., if A>B, then A–B>0). In one or more embodiments, B may be considered a threshold, and A is deemed to satisfy the threshold if A=B or if A>B, as determined using the ALU. In one or more embodiments of the technology, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 9.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from storage and perform computations to respond to the query. The DBMS may return the result(s) to the user, or software application.

The computing system of FIG. 9.1 may include functionality to present raw and/or processed data, such as results of comparisons and other processing. For example, presenting data may be accomplished through various presenting methods. Specifically, data may be presented through a user interface provided by a computing device. The user interface may include a graphical user interface (GUI) that displays information on a display device, such as a computer monitor or a touchscreen on a handheld computer device. The graphical user interface may include various graphical user interface widgets that organize what data is shown as well as how data is presented to a user. Furthermore, the graphical user interface may present data directly to the user, e.g., data presented as actual data values through text, or rendered by the computing device into a visual representation of the data, such as through visualizing a data model.

For example, a graphical user interface may first obtain a notification from a software application requesting that a particular data object be presented within the graphical user interface. Next, the graphical user interface may determine a data object type associated with the particular data object, e.g., by obtaining data from a data attribute within the data object that identifies the data object type. Then, the graphical user interface may determine any rules designated for displaying that data object type, e.g., rules specified by a software framework for a data object class or according to any local parameters defined by the graphical user interface for presenting that data object type. Finally, the graphical user interface may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 9.1 and the nodes and/or client device in FIG. 9.2. Other functions may be performed using one or more embodiments of the technology.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for servicing application requests from mobile devices, comprising:

receiving, from a client device, a first application request to test a first software application, wherein the first application request comprises a user credential associated with a user;

obtaining, based on the first application request and after verifying the user credential, a first application container package comprising a first production version of the first software application and a first context data comprising a script, a test credential, and a plurality of test data, wherein the script guides the user through an execution path of the first software application, and wherein the user credential is associated with the test credential and wherein the test credential is used by the first software application in place of the user credential and the same test credential is used by multiple users to anonymously test the first software application;

generating, according to the first context data, a first interface of the first production version of the first software application, wherein test data of the plurality of test data is used to populate fields within the first interface, wherein the test data is selected based on the test credential, wherein the same test data is defined for the multiple users using the same test credential, wherein to guide the user through the execution path of the first software application, the script deactivates at least one functionality of the first production version of the first software application visible on the first interface;

transmitting the first interface to the client device;

receiving, from the client device, a metadata input to the first interface, wherein the metadata input is representative of feedback, from the user, that pertains to the first interface;

storing the metadata input in the first application container package;

receiving, from the client device, a second application request to use the first software application; and transmitting, in response to the second application request, the first production version of the first software application.

2. The method of claim 1, wherein the metadata input is one selected from a list consisting of: a comment, an annotation, and a usage statistic.

3. The method of claim 1, wherein the metadata input is debugging data comprising at least one selected from a list consisting of: a screenshot, user input data, a debugging data type, user comment data, a memory content of the first interface, and an exit code generated by the first interface.

4. The method of claim 1, wherein the first context data further comprises interface layout data based, at least in part, on the first software application.

5. The method of claim 4, wherein the interface layout data is expressed in one selected from a group consisting of: Hypertext Markup Language (HTML), eXtensible Markup Language (XML), and Cascading Style Sheets (CSS).

6. The method of claim 1, further comprising:

receiving, from the client device, an input to the first interface;

generating, based on the input and according to the first context data, a second interface of the first production version of the first software application; and transmitting the second interface to the client device.

7. The method of claim 1, further comprising:

receiving, from a developer device, a software application package;

obtaining, from the software application package, a first production version of a second software application and a second context data; and generating a second application container package comprising the first production version of the second software application and the second context data.

8. The method of claim 7, further comprising:

receiving, from the client device, a third application request to test the second software application;

obtaining, based on the third application request, the second application container package;

generating, according to the second context data, a second interface of the first production version of the second software application; and transmitting the second interface to the client device.

9. The method of claim 1, further comprising:

receiving, from a developer device, a software application package;

obtaining, from the software application package, a second production version of the first software application; and storing the second production version of the first software application in the first application container package.

10. The method of claim 9, further comprising:

receiving, from the client device, a third application request to test the first software application;

obtaining, based on the third application request, the first application container package;

generating, according to second context data, a second interface of the second production version of the first software application; and transmitting the second interface to the client device.

11. The method of claim 1, further comprising:

receiving, from a second client device, a third application request comprising a second user credential for a second user;

determining, based on the second user credential, that the second application request is denied; and transmitting, based on the determination that the second application request is denied, the denial to the second client device.

12. The method of claim 1, further comprising:

after receiving the second application request from the client device, determining that the client device has permission to receive the first production version of the first software application, wherein the first production version of the first software application is transmitted to the client device by an application service that transmits the first interface.

13. A system comprising:

an application service; and wherein the application service is configured to:

receive, from a client device, a first application request to test a first software application, wherein the first application request comprises a user credential associated with a user;

obtain, based on the first application request and after verifying the user credential, a first application container package comprising a first production version of the first software application and a first context data comprising a script, a test credential, and a plurality of test data, wherein the script guides the user through an execution path of the first software application, and wherein the user credential is associated with the test credential and wherein the test credential is used by the first software application in place of the user credential and the same test credential is used by multiple users to anonymously test the first software application;

generate, according to the first context data, a first interface of the first production version of the first software application, wherein a test data of the plurality of test data is used to populate fields within the first interface, wherein the test data is selected based on the test credential, wherein the same test data is defined for the multiple users using the same test credential, wherein to guide the user through the execution path of the first software application, the script deactivates at least one functionality of the first production version of the first software application visible on the first interface;

transmit the first interface to the client device;

receive, from the client device, a metadata input to the first interface, wherein the metadata input is representative of feedback, from the user, that pertains to the first interface;

store the metadata input in the first application container package;

receive, from the client device, a second application request to use the first software application; and transmit, in response to the second application request, the first production version of the first software application.

14. The system of claim 13, further comprising: a developer device, wherein the application service is further configured to:

receive, from the developer device, a software application package;

obtain, from the software application package, a first production version of a second software application and a second context data; and generate a second application container package comprising the first production version of the second software application and the second context data.

15. The system of claim 13, wherein the application service is further configured to:

receive, from the client device, an input to the first interface;

generate, based on the input and according to the first context data, a second interface of the first production version of the software application; and transmit the second interface to the client device.

16. A non-transitory computer readable medium comprising instructions for performing a method, the method comprising:

receiving, from a client device, a first application request to test a software application, wherein the client device is operated by a user of the software application and wherein the first application request comprises a user credential associated with a user;

obtaining, based on the first application request and after verifying the user credential, an application container package comprising a production version of the software application and a context data comprising a script, a test credential, and a plurality of test data, wherein the script guides the user through an execution path of the software application, and wherein the user credential is associated with the test credential and wherein the test credential is used by the software application in place of the user credential and the same test credential is used by multiple users to anonymously test the software application;

generating, according to the context data, an interface of the production version of the software application, wherein a test data of the plurality of test data is used to populate fields within the interface, wherein the test data is selected based on the test credential, wherein the same test data is defined for the multiple users using the same test credential, wherein to guide the user through the execution path of the software application, the script deactivates at least one functionality of the production version of the software application visible on the interface;

transmitting the interface to the client device;

receiving, from the client device, a metadata input to the interface, wherein the metadata input is representative of feedback, from the user, that pertains to the interface;

storing the metadata input in the application container package;

receiving, from the client device, a second application request to use the software application; and transmitting, in response to the second application request, the production version of the software application.

* * * * *